(12) United States Patent
Jhang et al.

(10) Patent No.: US 11,854,293 B2
(45) Date of Patent: Dec. 26, 2023

(54) DISPLAY APPARATUS AND FINGERPRINT SENSING METHOD THEREOF

(71) Applicant: Novatek Microelectronics Corp., Hsinchu (TW)

(72) Inventors: Cho-Hsuan Jhang, Hsinchu (TW); Chao-Yu Meng, Hsinchu (TW); Shih-Cheng Chen, Taichung (TW); Chih-Peng Hsia, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 207 days.

(21) Appl. No.: 16/796,941

(22) Filed: Feb. 21, 2020

(65) Prior Publication Data

US 2020/0275001 A1 Aug. 27, 2020

Related U.S. Application Data

(60) Provisional application No. 62/808,842, filed on Feb. 22, 2019.

(51) Int. Cl.
*H04N 5/225* (2006.01)
*G06V 40/13* (2022.01)
*H04N 23/57* (2023.01)

(52) U.S. Cl.
CPC ...... *G06V 40/1312* (2022.01); *G06V 40/1306* (2022.01); *H04N 23/57* (2023.01)

(58) Field of Classification Search
None
See application file for complete search history.

(56) References Cited

U.S. PATENT DOCUMENTS

| 8,581,170 B2 | 11/2013 | Kurokawa |
| 9,342,733 B2 | 5/2016 | Lee et al. |

(Continued)

FOREIGN PATENT DOCUMENTS

| CN | 105447453 | 3/2016 |
| CN | 106814925 | 6/2017 |

(Continued)

OTHER PUBLICATIONS

English machine translation of Chinese patent publication CN 109002209A. (Year: 2018).*

(Continued)

*Primary Examiner* — Nicholas J Lee
(74) *Attorney, Agent, or Firm* — JCIPRNET

(57) ABSTRACT

A display apparatus and an fingerprint sensing method thereof are provided. A display panel of the display apparatus has a pixel circuit array, an in-display touch sensor array, and an in-display fingerprint sensor array. A driving circuit drives the in-display fingerprint sensor array to read a fingerprint image. A current display frame period is divided into a plurality of unit periods, each of the unit periods includes at least one fingerprint sensing period and one or both of a display driving period and a touch sensing period. The driving circuit resets a current fingerprint sensor in the in-display fingerprint sensor array during a first fingerprint sensing period among these fingerprint sensing periods of the first display frame period. The driving circuit reads a sensing result of the current fingerprint sensor during a second fingerprint sensing period succeeding to the first fingerprint sensing period.

3 Claims, 10 Drawing Sheets

(56) References Cited

U.S. PATENT DOCUMENTS

| | | |
|---|---|---|
| 9,524,993 B2 | 12/2016 | Kurokawa |
| 10,275,632 B2 | 4/2019 | Chen et al. |
| 10,592,037 B2 | 3/2020 | Noguchi |
| 10,614,279 B2 | 4/2020 | Kim et al. |
| 10,664,677 B2 | 5/2020 | Lee et al. |
| 10,726,238 B2 | 7/2020 | Gao et al. |
| 10,845,919 B2 | 11/2020 | Kang et al. |
| 2011/0198484 A1 | 8/2011 | Kurokawa |
| 2014/0061739 A1 | 3/2014 | Kurokawa |
| 2016/0078270 A1 | 3/2016 | Lee et al. |
| 2016/0148034 A1 | 5/2016 | Kremin et al. |
| 2017/0061190 A1 | 3/2017 | Chen et al. |
| 2017/0123566 A1 | 5/2017 | Noguchi |
| 2018/0164950 A1 | 6/2018 | Kang et al. |
| 2018/0173923 A1 | 6/2018 | Lee et al. |
| 2018/0349667 A1 | 12/2018 | Kim et al. |
| 2018/0349669 A1* | 12/2018 | Kim ................... G06F 3/041 |
| 2018/0373361 A1* | 12/2018 | Her .................... G06V 40/1318 |
| 2019/0370523 A1 | 12/2019 | Gao et al. |
| 2020/0174616 A1 | 6/2020 | Noguchi |
| 2020/0183563 A1* | 6/2020 | Weng ................... G09G 3/20 |

FOREIGN PATENT DOCUMENTS

| | | |
|---|---|---|
| CN | 108206013 | 6/2018 |
| CN | 108228006 | 6/2018 |
| CN | 108776789 | 11/2018 |
| CN | 108984018 | 12/2018 |
| CN | 109002209 A * | 12/2018 |
| TW | 201206183 | 2/2012 |
| TW | 201631956 | 9/2016 |
| TW | 201712406 | 4/2017 |
| TW | 201719499 | 6/2017 |

OTHER PUBLICATIONS

"Office Action of Taiwan Counterpart Application", dated Nov. 16, 2020, p. 1-p. 8.

"Office Action of China Counterpart Application", dated Feb. 8, 2023, p. 1-p. 11.

* cited by examiner

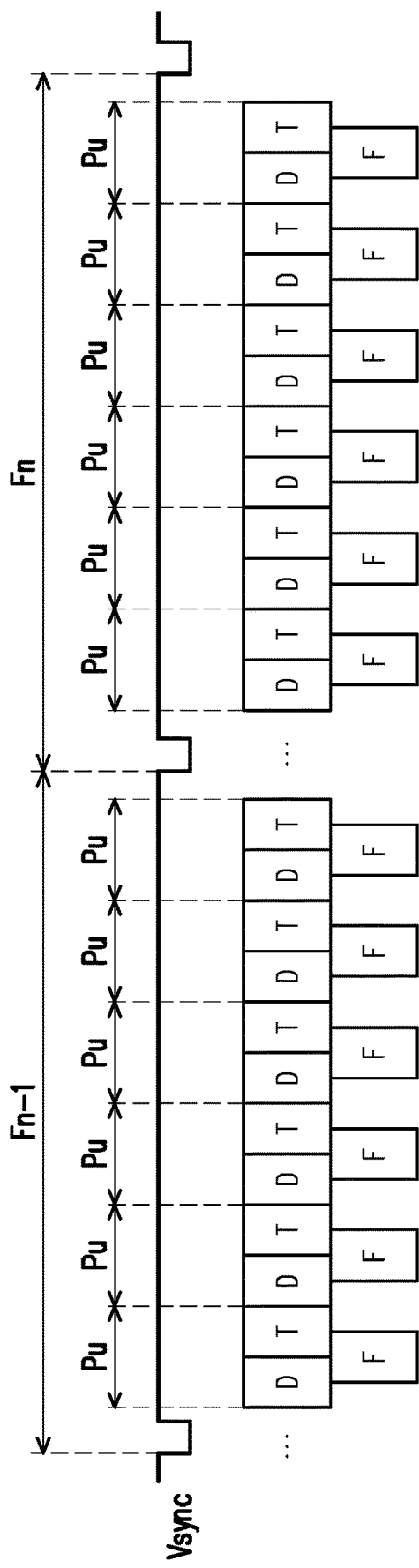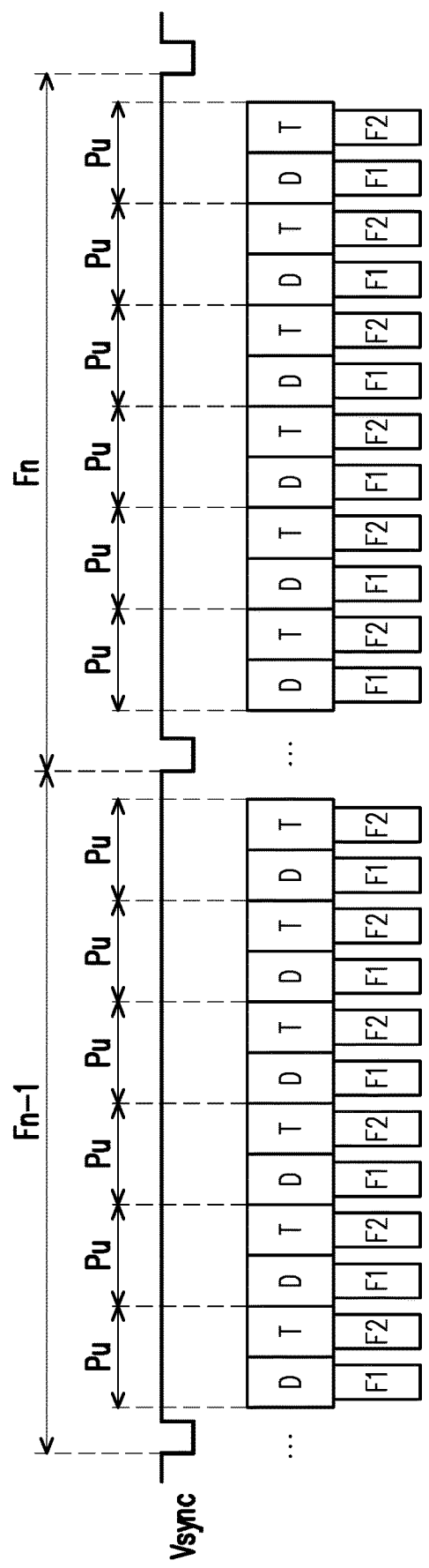
FIG. 13
FIG. 14

DISPLAY APPARATUS AND FINGERPRINT SENSING METHOD THEREOF

CROSS-REFERENCE TO RELATED APPLICATION

This application claims the priority benefit of U.S. provisional application Ser. No. 62/808,842, filed on Feb. 22, 2019. The entirety of the above-mentioned patent application is hereby incorporated by reference herein and made a part of this specification.

BACKGROUND

Field of the Invention

The invention relates to an electronic apparatus and more particular, to a display apparatus and a fingerprint sensing method thereof.

Description of Related Art

In order to reduce a volume of a display apparatus such as a handheld device, a fingerprint sensing region may overlap with a display region in a display panel. For example, an under-display fingerprint sensing technique is provided to dispose/adhere a fingerprint sensing device under (on the back of) a display panel, so as to sense/detect a fingerprint image through the display panel. Under the restriction of a penetration capability of a capacitive sensor, the under-display fingerprint sensing technique usually adopts an optical imaging or an optical sensing technique which senses/detects a fingerprint image based on lights transmitted through the display panel. For the under-display fingerprint sensing technique, because the display panel and the fingerprint sensing device are separate elements, the operation of the display panel may be independent of the operation of the fingerprint sensing device.

In the under-display fingerprint sensing technique, the fingerprint sensing device is disposed outside the display panel. In any way, a total thickness of the display panel and the fingerprint sensing device which are stacked with each is still indispensable. Based on a design demand for reducing the thickness of the display apparatus, an in-display fingerprint sensing technique has been accordingly developed. The in-display fingerprint sensing technique is different from the under-display fingerprint sensing technique in that a fingerprint sensor array is embedded in a display panel. Namely, the display panel with the in-display fingerprint sensing capability has a pixel circuit array and an in-display fingerprint sensor array. In a condition that the display panel is further capable of touch sensing, the display panel may have a pixel circuit array, an in-display touch sensor array and an in-display fingerprint sensor array. Because the fingerprint sensor array is embedded in the display panel, an operation of a display function and an operation of a fingerprint sensing function are influenced by each other. Regarding the in-display fingerprint sensing, how to arrange display driving periods (and/or a touch sensing periods) and fingerprint sensing periods is a technical subject.

It should be noted that the contents of the section of "Description of Related Art" is used for facilitating the understanding of the invention. A part of the contents (or all of the contents) disclosed in the section of "Description of Related Art" may not pertain to the conventional technology known to the persons with ordinary skilled in the art. The contents disclosed in the section of "Description of Related Art" do not represent that the contents have been known to the persons with ordinary skilled in the art prior to the filing of this invention application.

SUMMARY

The invention provides a display apparatus and a fingerprint sensing method thereof for arranging a timing relationship between display driving periods (and/or touch sensing periods) and fingerprint sensing periods.

According to an embodiment of the invention, a display apparatus is provided. The display apparatus includes a display panel and a driving circuit. The display panel has a pixel circuit array, an in-display touch sensor array and an in-display fingerprint sensor array. The driving circuit is coupled to the display panel. The driving circuit is configured to drive the in-display fingerprint sensor array to obtain information for generating a fingerprint image. A first display frame period is divided into a plurality of unit periods, and each of the unit periods includes at least one fingerprint sensing period and one or both of a display driving period and a touch sensing period. The driving circuit resets a current fingerprint sensor in the in-display fingerprint sensor array during a first fingerprint sensing period among the fingerprint sensing periods of the first display frame period. The driving circuit reads a sensing result of the current fingerprint sensor during a second fingerprint sensing period succeeding to the first fingerprint sensing period.

According to an embodiment of the invention, a fingerprint sensing method of a display apparatus is provided. The display apparatus includes a display panel and a driving circuit. The display panel has a pixel circuit array, an in-display touch sensor array and an in-display fingerprint sensor array. A plurality of output node of the in-display fingerprint sensor array are coupled to the driving circuit. The fingerprint sensing method includes: resetting a plurality of sensors of a current fingerprint sensor row during a first fingerprint sensing period; sampling each of the output nodes of the in-display fingerprint sensor array to obtain sampling voltages of the sensors of the current fingerprint sensor row during a second fingerprint sensing period succeeding to the first fingerprint sensing period; and reading sensing results of the sensors of the current fingerprint sensor row during the second fingerprint sensing period. Wherein, a first display frame period is divided into a plurality of unit periods, and each of the unit periods comprises at least one fingerprint sensing period and one or both of a display driving period and a touch sensing period.

According to an embodiment of the invention, a display apparatus is provided. The display apparatus includes a display panel and a driving circuit. The display panel has a pixel circuit array, an in-display touch sensor array and an in-display fingerprint sensor array. The driving circuit is coupled to the display panel. The driving circuit is configured to drive the in-display fingerprint sensor array to obtain information for generating a fingerprint image. The driving circuit performs one or both of a display driving operation and a touch sensing operation during a display frame period. The driving circuit performs a fingerprint sensing operation during a skip period after the display frame period.

Based on the above, the display apparatus and the fingerprint sensing method thereof provided by the embodiments of the invention can drive the display panel having the pixel circuit array, the in-display touch sensor array and the in-display fingerprint sensor array. A display frame period corresponding to the pixel circuit array can be divided into a plurality of unit periods. During the current display frame period, each of the unit periods includes the display driving period (and/or the touch sensing period) and the at least one fingerprint sensing period. In this way, the display apparatus and the fingerprint sensing method thereof provided by the embodiments of the invention can arrange the timing relationship between the display driving periods (and/or the touch sensing periods) and the fingerprint sensing periods.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 13 is a schematic diagram illustrating a plurality of unit periods of a display frame period according to another embodiment of the invention.

FIG. 14 is a schematic diagram illustrating a plurality of unit periods of a display frame period according to yet another embodiment of the invention.

DESCRIPTION OF EMBODIMENTS

Figure 1:
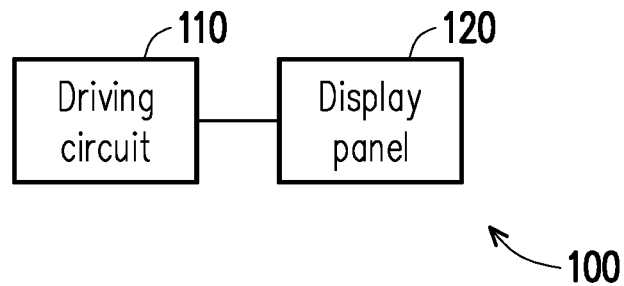
FIG. 1 is a schematic circuit block diagram illustrating a display apparatus according to an embodiment of the invention.

A term "couple" used in the full text of the disclosure (including the claims) refers to any direct and indirect connections. For instance, if a first device is described to be coupled to a second device, it is interpreted as that the first device is directly coupled to the second device, or the first device is indirectly coupled to the second device through other devices or connection means. The terms "first" and "second" mentioned in the full text of the specification (including the claims) are used to name the elements, or for distinguishing different embodiments or scopes, instead of restricting the upper limit or the lower limit of the numbers of the elements, nor limiting the order of the elements. Moreover, wherever possible, components/members/steps using the same referral numerals in the drawings and description refer to the same or like parts. Components/members/steps using the same referral numerals or using the same terms in different embodiments may cross-refer related descriptions.

FIG. 1 is a schematic circuit block diagram illustrating a display apparatus 100 according to an embodiment of the invention. The display apparatus 100 illustrated in FIG. 1 includes a driving circuit 110 and a display panel 120. The driving circuit 110 is coupled to the display panel 120. The display panel 120 has a pixel circuit array, an in-display touch sensor array and an in-display fingerprint sensor array. The driving circuit 110 may drive the pixel circuit array of the display panel 120 to display an image frame on the display panel 120. The driving circuit 110 may drive the in-display touch sensor array of the display panel 120 to detect a touch event. The driving circuit 110 may drive the in-display fingerprint sensor array of the display panel 120 and readout sensing results. The display panel 120 is not limited to any particular structure in the present embodiment. The display panel 120 may be any panel with a display function, a touch sensing function and a fingerprint sensing function. For example, in some embodiments, the display panel 120 may be a conventional in-display fingerprint sensing panel or other display panels.

Figure 2:
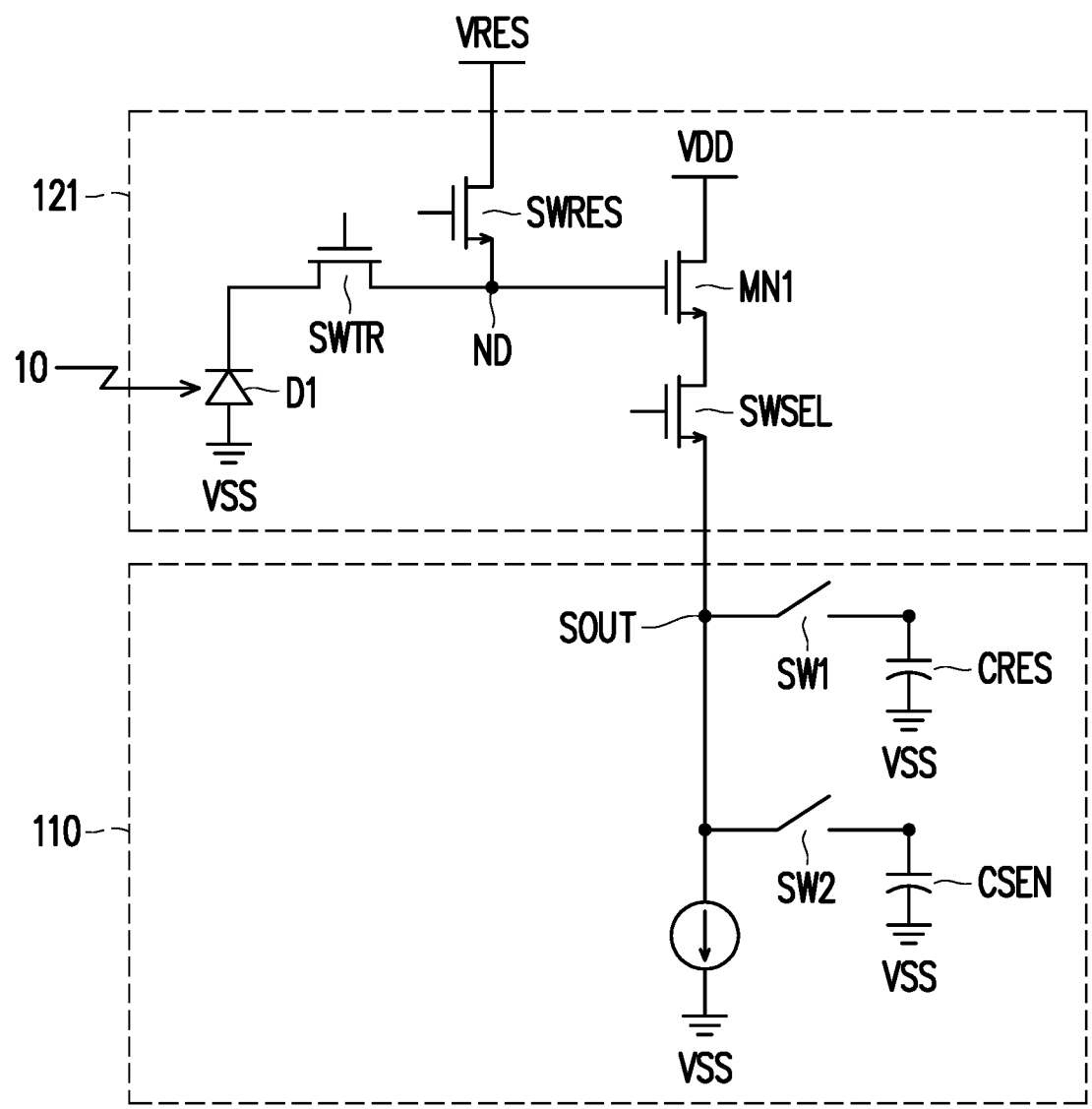
FIG. 2 is a schematic circuit block diagram illustrating a fingerprint sensor in the in-display fingerprint sensor array in the display panel depicted in FIG. 1 according to an embodiment of the invention.

FIG. 2 is a schematic circuit block diagram illustrating a fingerprint sensor 121 of the in-display fingerprint sensor array in the display panel 120 depicted in FIG. 1 according to an embodiment of the invention. It should be noted that in other embodiments, the implementation manner of the in-display fingerprint sensor array in the display panel 120 is not limited to that illustrated in FIG. 2. The in-display fingerprint sensor array in the display panel 120 illustrated in FIG. 1 include a plurality of fingerprint sensors (pixel circuits), for example, a fingerprint sensor 121 illustrated in FIG. 2. The fingerprint sensor 121 includes a photosensitive device such as a photodiode D1, a transistor MN1 (being as a source follower), a transfer switch SWTR, a reset switch SWRES and a selection switch SWSEL. The photodiode D1 is coupled between a reset voltage VRES and a reference voltage VSS in reverse bias, as illustrated in FIG. 2. A node SOUT is an output node of the fingerprint sensor 121. FIG. 2 also illustrates components in the driving circuit 110 for controlling readout operation of the fingerprint sensor 121, including a first sampling switch SW1, a second sampling switch SW2, a reset capacitor CRES and a sampling capacitor CSEN.

In a reset stage the driving circuit 110 may reset the fingerprint sensor 121. When in the reset stage, the reset switch SWRES and the transfer switch SWTR are turned on for a short period such that a voltage of the photodiode D1, which equals a voltage of the node ND, is reset. After the reset stage the transfer switch SWTR is turned OFF, and the photodiode D1 starts being in exposure, which means the photodiode D1 is irradiated by light reflected by a finger touching the display panel 120 and then the voltage of the node ND may drop due to a photoelectric effect. The length of the exposure time is predetermined. The longer the exposure time, the more the voltage of the node ND drops down.

After the predetermined exposure time, the driving circuit 110 may acquire a sensing result from the fingerprint sensor 121, which is performed in a stage called a sampling stage in the present disclosure. In the sampling stage, firstly, the reset switch SWRES, the selection switch SWSEL and the first sampling switch SW1 in the driving circuit 110 are controlled properly to reset the voltage of the output node SOUT and then sample the voltage of the output node SOUT. A reset voltage on the output node SOUT is stored in the sampling capacitor CRES. Next, the transfer switch SWTR is turned on such that the voltage of the node ND determined by the photodiode D1 is transferred to the output node SOUT, and the second sampling switch SW2 in the driving circuit 110 is controlled to sample the voltage of the output node SOUT. Thereby, a sampling voltage is stored in the sampling capacitor CSEN. After the sampling stage, the driving circuit 110 may perform readout operation (as in a readout stage), which means to generate a digital code by performing analog-to-digital conversion on a voltage difference between the reset voltage and the sampling voltage. The voltage difference between the reset voltage and the sampling voltage may represent an intensity of the reflection light 10 and is taken as the sensing result from the fingerprint sensor 121. The driving circuit 110 may generate digital codes corresponding to sensing results of each fingerprint sensing row, and output the digital code to a host processing unit such as an application processor in a hand held device to generate a fingerprint image and execute fingerprint authentication.

Figure 3:
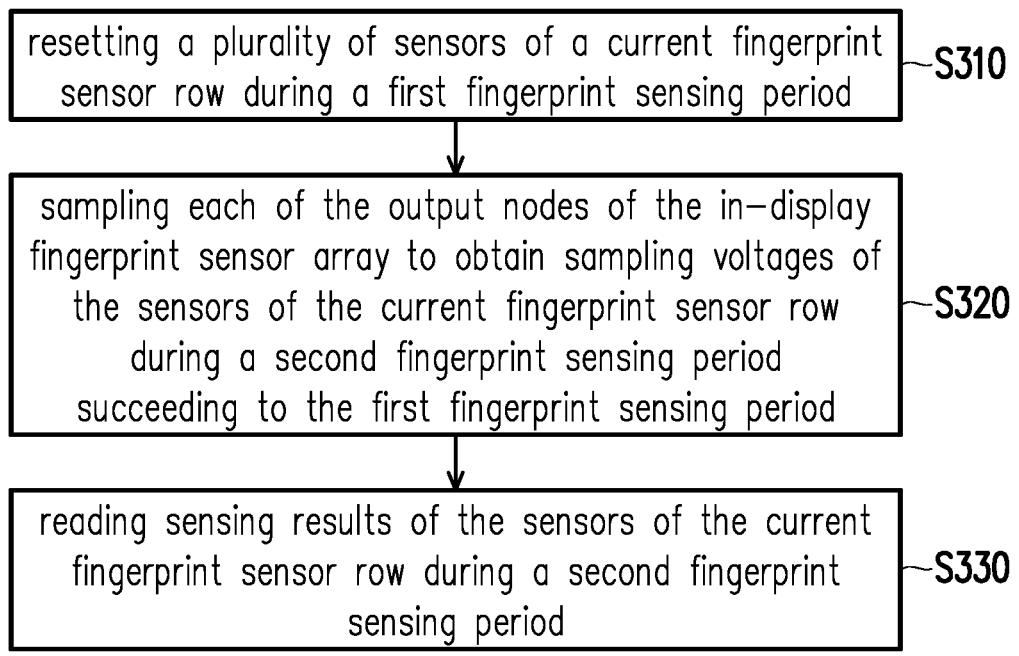
FIG. 3 is a flowchart illustrating a fingerprint sensing method of a display apparatus according to an embodiment of the invention.

FIG. 3 is a flowchart illustrating an fingerprint sensing method of a display apparatus according to an embodiment of the invention. In step S310, the driving circuit 110 may reset a plurality of sensors of a current fingerprint sensor row during a fingerprint sensing period. In an embodiment of the invention, the fingerprint sensing period is in every unit period of a display frame period, and a timing scheme is referred to FIG. 4.

Figure 4:
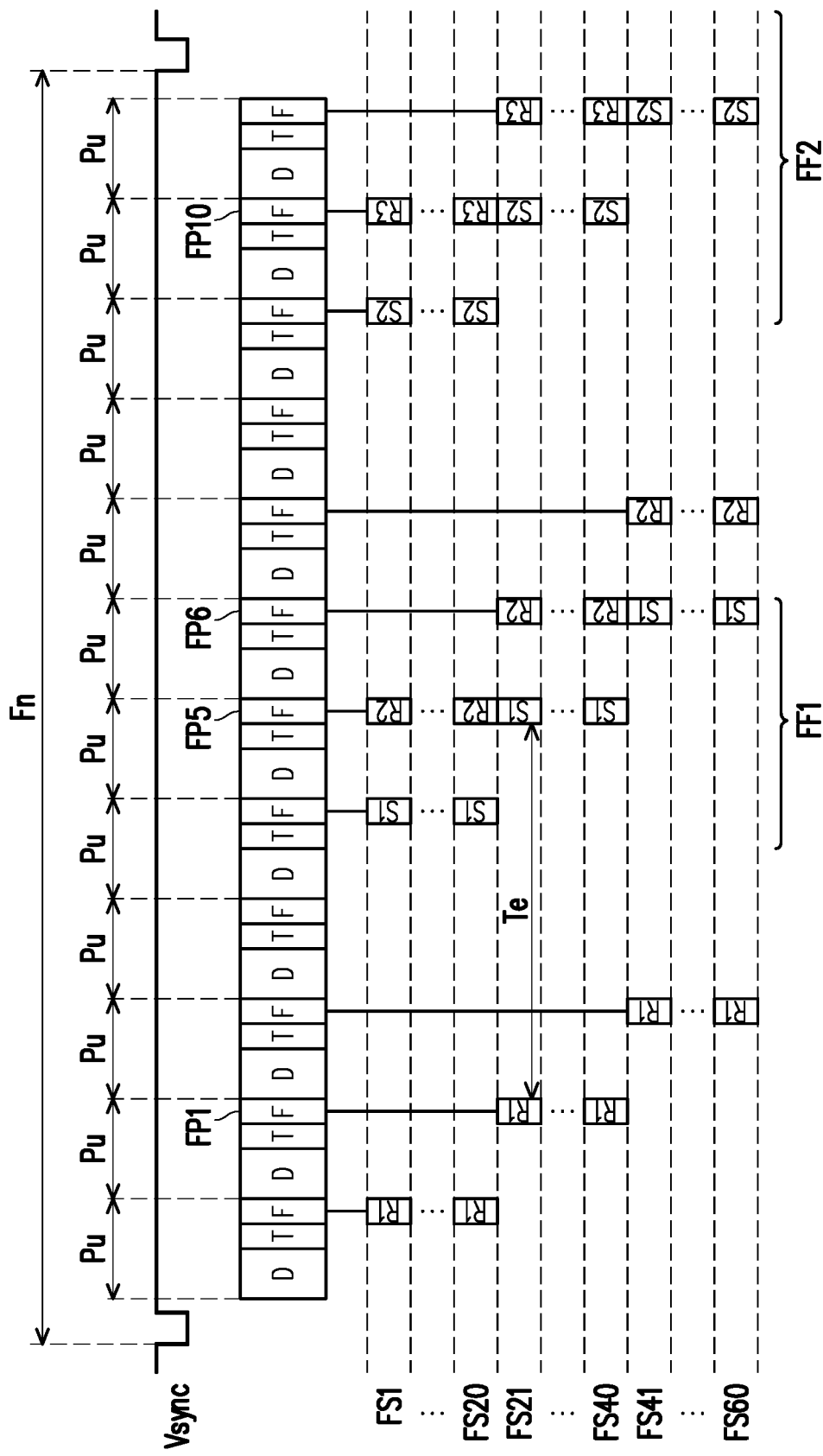
FIG. 4 is a schematic diagram illustrating a plurality of unit periods of a display frame period according to an embodiment of the invention.

FIG. 4 is a schematic diagram illustrating a plurality of unit periods of a display frame period according to an embodiment of the invention. In FIG. 4, the horizontal axis represents the time. A vertical synchronous signal Vsync illustrated in FIG. 4 is conventional and thus, will not be repeatedly described. The vertical synchronous signal Vsync may define a length of the display frame period. A display frame period Fn (e.g., a current display frame period) illustrated in FIG. 4 may be divided into a plurality of unit periods PU. In the embodiment illustrated in FIG. 4, each of the unit periods PU includes a display driving period D, a touch sensing period T and a fingerprint sensing period F, and the display driving period D, the touch sensing period T and the fingerprint sensing period F do not overlap with one another. Different unit periods PU in the same display frame period Fn are configured in the same way.

The driving circuit 110 may drive a part of pixel circuits of the pixel circuit array of the display panel 120 during one display driving period D. The pixel circuit array is not limited to any particular structure in the present embodiment. For example, in some embodiments, the pixel circuit array of the display panel 120 may be a conventional pixel circuit array or other pixel circuit arrays. After finishing an operation of the display driving periods D in the display frame period Fn, the driving circuit 110 may display the image frame on the display panel 120.

The driving circuit 110 may drive/read a part of touch sensors of the in-display touch sensor array of the display panel 120 during one of the touch sensing periods T. The in-display touch sensor array is not limited to any particular structure in the present embodiment. For example, in some embodiments, the in-display touch sensor array of the display panel 120 may be a conventional touch sensor array or other touch sensor arrays. After finishing an operation of the plurality of touch sensing periods T in the display frame period Fn, the driving circuit 110 may detect a location of the touch event of the display panel 120.

The driving circuit 110 may drive/read a part of fingerprint sensors of the in-display fingerprint sensor array of the display panel 120 during one of the fingerprint sensing periods F. The in-display fingerprint sensor array is not limited to any particular structure in the present embodiment. For example, in some embodiments, the in-display fingerprint sensor array of the display panel 120 may be a conventional fingerprint sensor array or other fingerprint sensor array. After finishing a fingerprint sensing operation in the display frame period Fn, the driving circuit 110 may obtain information for generating a fingerprint image (including a fingerprint image frame, a plurality of fingerprint image frame or a part of the fingerprint image frames).

The symbols FS1, FS20, FS21, FS40, FS41 and FS60 illustrated in FIG. 4 represent a plurality of fingerprint sensor rows in the in-display fingerprint sensor array of the display panel 120. The number of the fingerprint sensor rows FS1 to FS60 in the in-display fingerprint sensor array of the display panel 120 may be determined according to design requirements. "Ri (reset)" illustrated in FIG. 4 represents that the driving circuit 110 resets sensors of a fingerprint sensor row, and "Si (sample)" illustrated in FIG. 4 represents that the driving circuit 110 obtains sampling voltages corresponding to sensors of a fingerprint sensor row during a corresponding fingerprint sensing period F. The sequential number i represents the number of times that the same sensor row is reset or sampled. Each sampling voltage is the voltage of the output node SOUT of a sensor of the fingerprint sensor row acquired in the sampling stage.

Referred to FIG. 4, the driving circuit 110 may reset a plurality of sensors of a current fingerprint sensor row, such as FS21, during a fingerprint sensing period FP. The reset operation to the fingerprint sensor row FS21 may be the first time and is denoted as "R1". A plurality of fingerprint sensor rows, such as the fingerprint sensor rows FS21-FS40, may be reset ("R1") sequentially (i.e. row by row) during the fingerprint sensing period FP1.

In step S320, the driving circuit 110 may sample each output node (SOUT) of the sensors of the current fingerprint sensor row (e.g., the fingerprint sensor row FS21) in the in-display fingerprint sensor array to obtain sampling voltages during a succeeding fingerprint sensing period (e.g., a fingerprint sensing period FP5) among the fingerprint sensing periods F. Referred to FIG. 4, the sampling operation to the fingerprint sensor row FS21 may be the first time and is denoted as "S1". A plurality of fingerprint sensor rows, such as the fingerprint sensor rows FS21-FS40, may be sampled ("S1") sequentially (i.e. row by row) during the fingerprint sensing period FP5.

In step S330, the driving circuit 110 may readout sensing results of the sensors of the current fingerprint sensor row (e.g., the fingerprint sensor row FS21) in the in-display fingerprint sensor array during a corresponding fingerprint sensing period, which may be the same as the fingerprint sensing period in which the sampling to the current fingerprint sensor row is performed (e.g., the fingerprint sensing period FP5). One or more unit periods PU are between the fingerprint sensing period FP1 and the fingerprint sensing period FP5. A time from the fingerprint sensing period FP1, in which the reset operation to the current fingerprint sensor row FS21 is performed, to the fingerprint sensing period FP5, in which the sampling and readout operation to the current fingerprint sensor row FS21 is performed, is an exposure time Te of the current fingerprint sensor row FS21. A plurality of fingerprint sensor rows, such as the fingerprint sensor rows FS21-FS40, may be readout sequentially (i.e. row by row) during the fingerprint sensing period F5. In the embodiment illustrated in FIG. 4, the fingerprint sensing period FP1 and the fingerprint sensing period FP5 both belong to the same current display frame period Fn.

It is noted that, with respect to each fingerprint sensor row, after the first time of the sampling (and readout) operation is completed, the second time of the reset operation to the same fingerprint sensor row can be performed in a succeeding fingerprint sensing period belonging to the same current display frame period Fn. For example, with respect to the fingerprint sensor row FS21, the second time of reset operation (denoted "R2") may be performed during a fingerprint sensing period FP5; also, the second time of sampling (and readout) operation (denoted "S2") may be performed during a fingerprint sensing period FP10.

Operations of the fingerprint sensors rows FS1 to FS60 may be inferred with reference to the description related to the fingerprint sensor row FS21 and thus, will not be repeated. After every time finishing a fingerprint sensing operation, including reset, sampling and reading operations, of all the fingerprint sensor rows FS1 to FS60, the driving circuit 110 may obtain information (represented by ADC output codes) for generating a fingerprint image frame FF1. According to repeat the fingerprint sensing operation, the driving circuit 110 may obtain information (represented by ADC output codes) for generating another fingerprint image frame FF2 during the same display frame period Fn. It should be noted that in the embodiment illustrated in FIG. 4, the fingerprint sensing operation of one fingerprint sensor row is independent from the fingerprint sensing operation to another fingerprint sensor row. For example, the driving circuit 110 may not only obtain the sampling voltage and read the sensing result of the current fingerprint sensor row FS21, but also reset at least one fingerprint sensor row (e.g., the fingerprint sensor row FS20) in the in-display fingerprint sensor array during the corresponding fingerprint sensing period FC.

Figure 5:
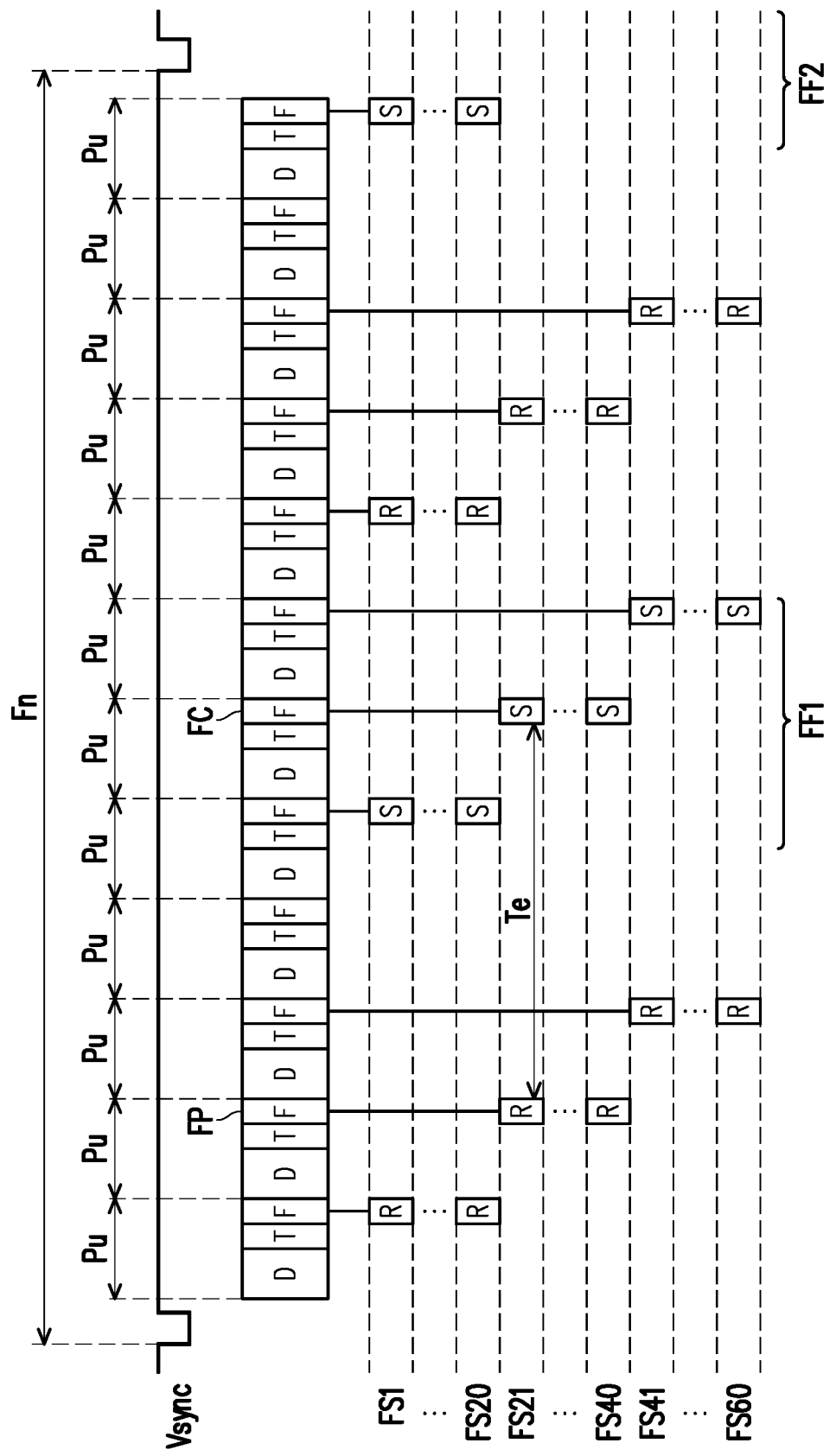
FIG. 5 is a schematic diagram illustrating a plurality of unit periods of a display frame period according to another embodiment of the invention.

As another example, FIG. 5 is a schematic diagram illustrating a plurality of unit periods of a display frame period according to another embodiment of the invention. In FIG. 5, the horizontal axis represents the time. A vertical synchronous signal Vsync, fingerprint sensor rows FS1 to FS60, a display frame period Fn, unit periods PU, display driving periods D, touch sensing periods T, fingerprint sensing periods F, "Ri (reset)", "Si (sample)" and an exposure time Te illustrated in FIG. 5 may be inferred with reference to the descriptions related to the embodiment illustrated in FIG. 4 and thus, will not be repeated. After finishing sampling/reading operations of the fingerprint sensor rows FS1 to FS60, the driving circuit 110 may obtain a fingerprint image frame FF1 according to the sensing results of the fingerprint sensor rows FS1 to FS60 during the display frame period Fn. It should be noted that in the embodiment illustrated in FIG. 5, the driving circuit 110 may obtain the sampling voltage read the sensing result of the current fingerprint sensor or reset the current fingerprint sensor during each fingerprint sensing period F.

Figure 6:
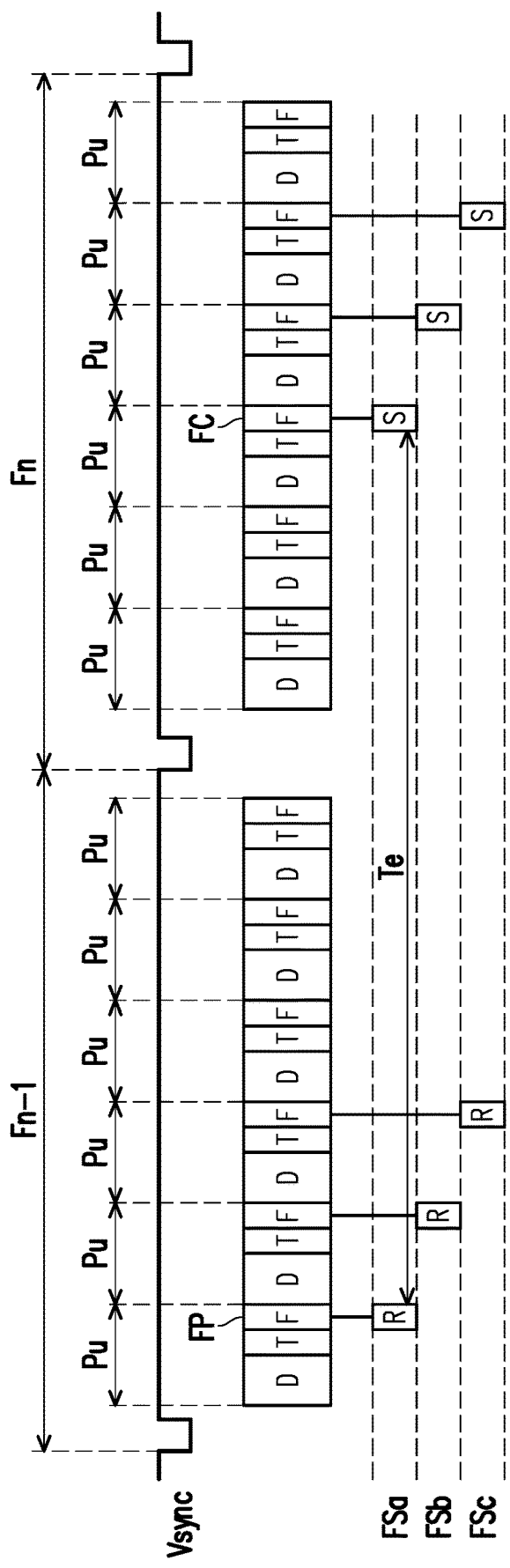
FIG. 6 is a schematic diagram illustrating a plurality of unit periods of a display frame period according to yet another embodiment of the invention.

FIG. 6 is a schematic diagram illustrating a plurality of unit periods of a display frame period according to yet another embodiment of the invention. In FIG. 6, the horizontal axis represents the time. The symbols FSa, FSb and FSc illustrated in FIG. 6 respectively represent fingerprint sensor row groups including one or more sensor rows in the in-display fingerprint sensor array of the display panel 120. For example, the fingerprint sensor row group FSa may represent the fingerprint sensor rows from a $1^{st}$ row to a $20^{th}$ row, and the fingerprint sensor row group FSb may represent the fingerprint sensor rows from a $21^{st}$ row to a $40^{th}$ row. The fingerprint sensor row group FSa, the fingerprint sensor row group FSb and the fingerprint sensor row group FSc illustrated in FIG. 6 may be inferred with reference to the description related to the fingerprint sensor rows FS1 to FS60 illustrated in FIG. 4, and a vertical synchronous signal Vsync, a display frame period Fn, unit periods PU, display driving periods D, touch sensing periods T, fingerprint sensing periods F, "R (reset)", "S (sample)" and an exposure time Te illustrated in FIG. 6 may be inferred with reference to the descriptions related to those illustrated in FIG. 4, which will not be repeated.

The fingerprint sensing method may be performed based on the timing scheme shown in FIG. 6. In step S310, the driving circuit 110 sequentially (i.e. row by row) resets rows of a current fingerprint sensor row group (e.g., the fingerprint sensor row group FSa) in the in-display fingerprint sensor array during a fingerprint sensing period (e.g., the fingerprint sensing period FP) among the fingerprint sensing periods F of a display frame period Fn−1 illustrated in FIG. 6. In step S320, the driving circuit 110 sequentially (i.e. row by row) samples rows of the current fingerprint sensor row group (e.g. FSa) in the in-display fingerprint sensor array during a fingerprint sensing period (e.g., a fingerprint sensing period FC) among the fingerprint sensing periods F of a display frame period Fn illustrated in FIG. 6. In step S330, the driving circuit 110 reads sensing results of the current fingerprint sensor row group (e.g., the fingerprint sensor row group FSa) in the in-display fingerprint sensor array during a corresponding fingerprint sensing period (e.g., the fingerprint sensing period FC) among the fingerprint sensing periods F of the display frame period Fn illustrated in FIG. 6. One or more unit periods PU are between the previous fingerprint sensing period FP and the corresponding fingerprint sensing period FC. A time from the fingerprint sensing period FP in which the reset operation to the current fingerprint sensor row group is performed to the fingerprint sensing period FC in which the sampling and readout operation to the current fingerprint sensor row group is performed is an exposure time Te of the current fingerprint sensor row group FSa. It should be noted that in the embodiment illustrated in FIG. 6, the fingerprint sensing period FC belongs to the display frame period Fn, and the fingerprint sensing period FP belongs to the display frame period Fn−1, wherein the display frame period Fn−1 is prior to the display frame period Fn.

Figure 7:
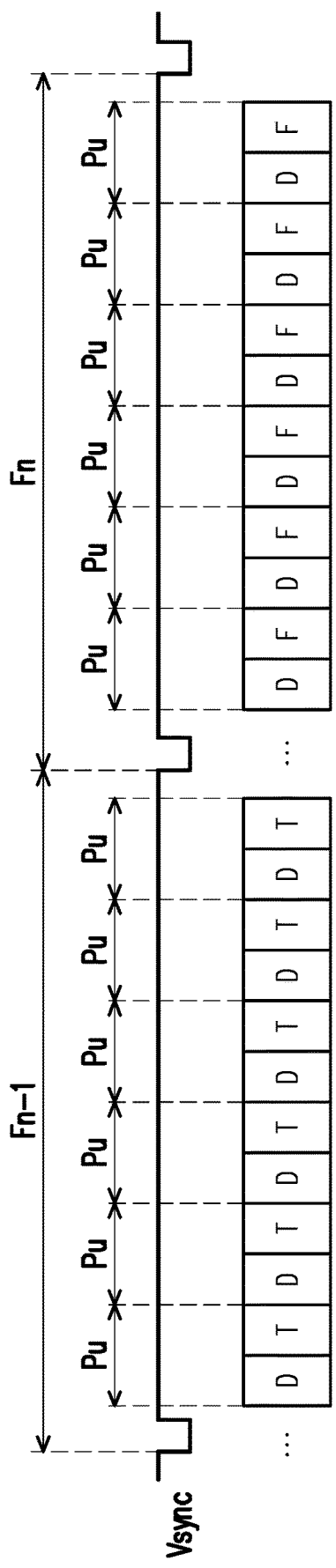
FIG. 7 is a schematic diagram illustrating a plurality of unit periods of a display frame period according to still another embodiment of the invention.

FIG. 7 is a schematic diagram illustrating a plurality of unit periods of a display frame period according to still another embodiment of the invention. In FIG. 7, the horizontal axis represents the time. A vertical synchronous signal Vsync, current a display frame period Fn, a previous display frame period Fn−1, unit periods PU, display driving periods D, touch sensing periods T and fingerprint sensing periods F illustrated in FIG. 7 may be inferred with reference to the descriptions related to the embodiments illustrated in FIG. 4 through FIG. 6 and thus, will not be repeated. It should be noted that in the embodiment illustrated in FIG. 7, each of the unit periods PU in the previous display frame period Fn−1 includes a display driving period D and a touch sensing period T, and each of the unit periods PU in the current display frame period Fn includes a display driving period D and a fingerprint sensing period F. Based on the timing scheme of FIG. 7, n may be an even number. Each of the unit periods PU in the previous display frame period Fn−1 does not include any fingerprint sensing period F, and each of the unit periods PU in the current display frame period Fn does not include any touch sensing period T. The display driving period D, the touch sensing period T and the fingerprint sensing period F do not overlap with one another.

Figure 8:
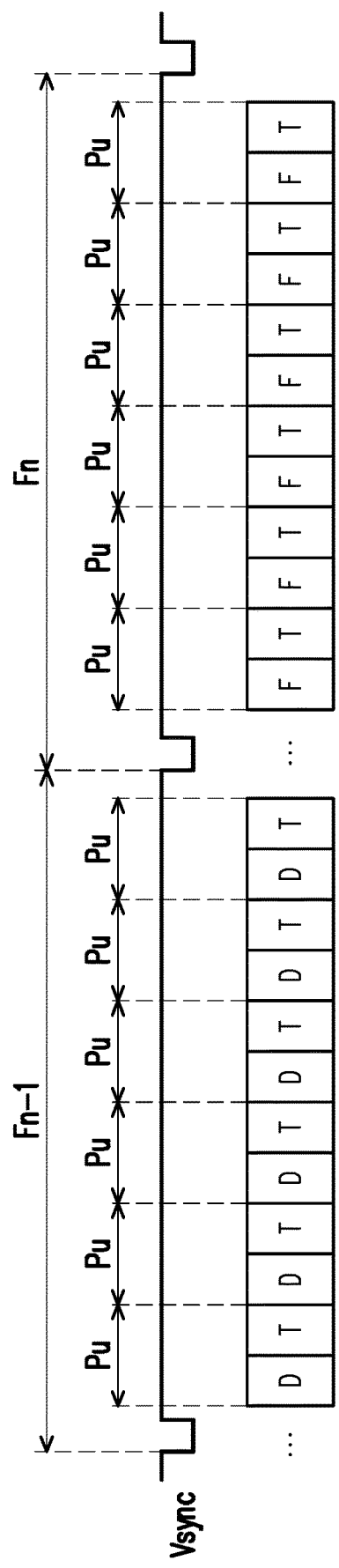
FIG. 8 is a schematic diagram illustrating a plurality of unit periods of a display frame period according to further another embodiment of the invention.

FIG. 8 is a schematic diagram illustrating a plurality of unit periods of a display frame period according to further another embodiment of the invention. In FIG. 8, the horizontal axis represents the time. A vertical synchronous signal Vsync, a current display frame period Fn, a previous display frame period Fn−1, unit periods PU, display driving periods D, touch sensing periods T and fingerprint sensing periods F illustrated in FIG. 8 may be inferred with reference to the descriptions related to the embodiments illustrated in FIG. 4 through FIG. 7 and thus, will not be repeated. It should be noted that in the embodiment illustrated in FIG. 8, each of the unit periods PU in the previous display frame period Fn−1 includes a display driving period D and a touch sensing period T, and each of the unit periods PU in the current display frame period Fn includes a fingerprint sensing period F and a touch sensing period T. Based on the timing scheme of FIG. 8, n may be an even number. Each of the unit periods PU in the previous display frame period Fn−1 does not include any fingerprint sensing period F, and each of the unit periods PU in the current display frame period Fn does not include any display driving period D. The display driving period D, the touch sensing period T and the fingerprint sensing period F do not overlap with one another.

Figure 9:
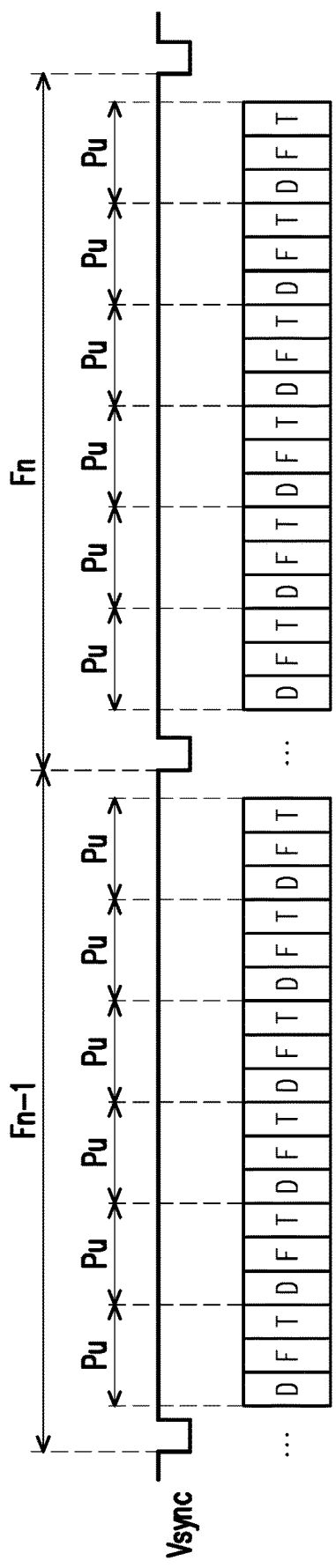
FIG. 9 is a schematic diagram illustrating a plurality of unit periods of a display frame period according to yet another embodiment of the invention.

FIG. 9 is a schematic diagram illustrating a plurality of unit periods of a display frame period according to yet another embodiment of the invention. In FIG. 9, the horizontal axis represents the time. A vertical synchronous signal Vsync, a current display frame period Fn and a previous display frame period Fn−1 illustrated in FIG. 9 may be inferred with reference to the descriptions related to the embodiments illustrated in FIG. 4 through FIG. 8, and unit periods PU, display driving periods D, touch sensing periods T and fingerprint sensing periods F illustrated in illustrated in FIG. 9 may be inferred with reference to the descriptions related to the embodiments illustrated in FIG. 4 through FIG. 6, which will not be repeated. It should be noted that in the embodiment illustrated in FIG. 9, each of the unit periods PU includes a display driving period D, a touch sensing period T and a fingerprint sensing period F, wherein in each of the unit periods PU, the display driving period D, the touch sensing period T and the fingerprint sensing period F do not overlap with one another, and the fingerprint sensing period F is configured between the display driving period D and the touch sensing period T.

Figure 10:
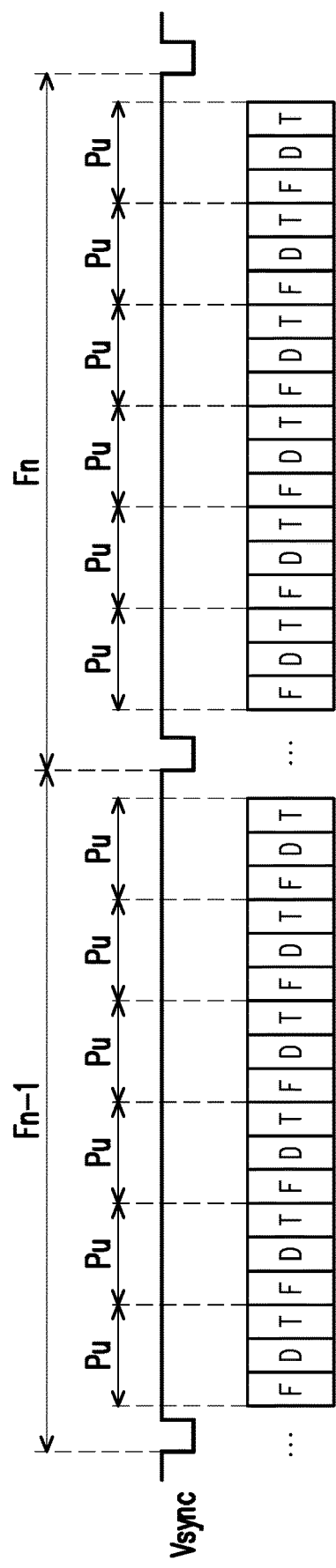
FIG. 10 is a schematic diagram illustrating a plurality of unit periods of a display frame period according to another embodiment of the invention.

FIG. 10 is a schematic diagram illustrating a plurality of unit periods of a display frame period according to another embodiment of the invention. In FIG. 10, the horizontal axis represents the time. A vertical synchronous signal Vsync, a current display frame period Fn and a previous display frame period Fn−1 illustrated in FIG. 10 may be inferred with reference to the descriptions related to the embodiments illustrated in FIG. 4 through FIG. 8, and unit periods PU, display driving periods D, touch sensing periods T and fingerprint sensing periods F illustrated in FIG. 10 may be inferred with reference to the descriptions related to the embodiments illustrated in FIG. 4 through FIG. 6, which will not be repeated. It should be noted that in the embodiment illustrated in FIG. 10, each of the unit periods PU includes a display driving period D, a touch sensing period T and a fingerprint sensing period F, wherein in each of the unit periods PU, the display driving period D, the touch sensing period T and the fingerprint sensing period F do not overlap with one another, and the display driving period D is configured between the fingerprint sensing period F and the touch sensing period T.

Figure 11:
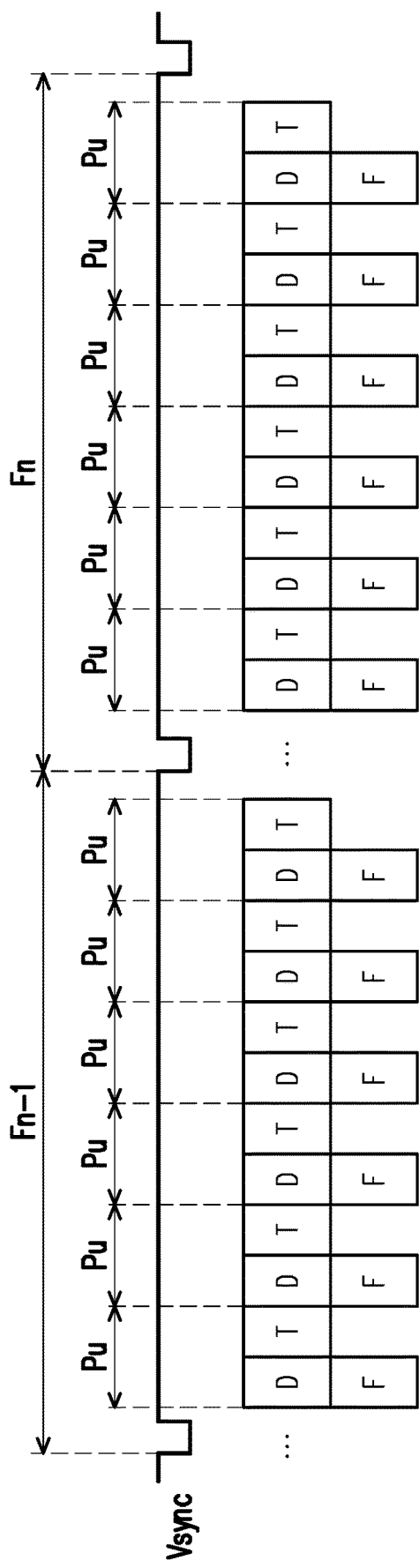
FIG. 11 is a schematic diagram illustrating a plurality of unit periods of a display frame period according to still another embodiment of the invention.

FIG. 11 is a schematic diagram illustrating a plurality of unit periods of a display frame period according to still another embodiment of the invention. In FIG. 11, the horizontal axis represents the time. A vertical synchronous signal Vsync, a current display frame period Fn and a previous display frame period Fn−1 illustrated in FIG. 11 may be inferred with reference to the descriptions related to the embodiments illustrated in FIG. 4 through FIG. 8, and unit periods PU, display driving periods D, touch sensing periods T and fingerprint sensing periods F illustrated in FIG. 11 may be inferred with reference to the descriptions related to the embodiments illustrated in FIG. 4 through FIG. 6, which will not be repeated. It should be noted that in the embodiment illustrated in FIG. 11, each of the unit periods PU includes a display driving period D, a touch sensing period T and a fingerprint sensing period F, wherein in each of the unit periods PU, the display driving period D and the touch sensing period T do not overlap with each other, and the fingerprint sensing period F overlaps with the display driving period D.

Figure 12:
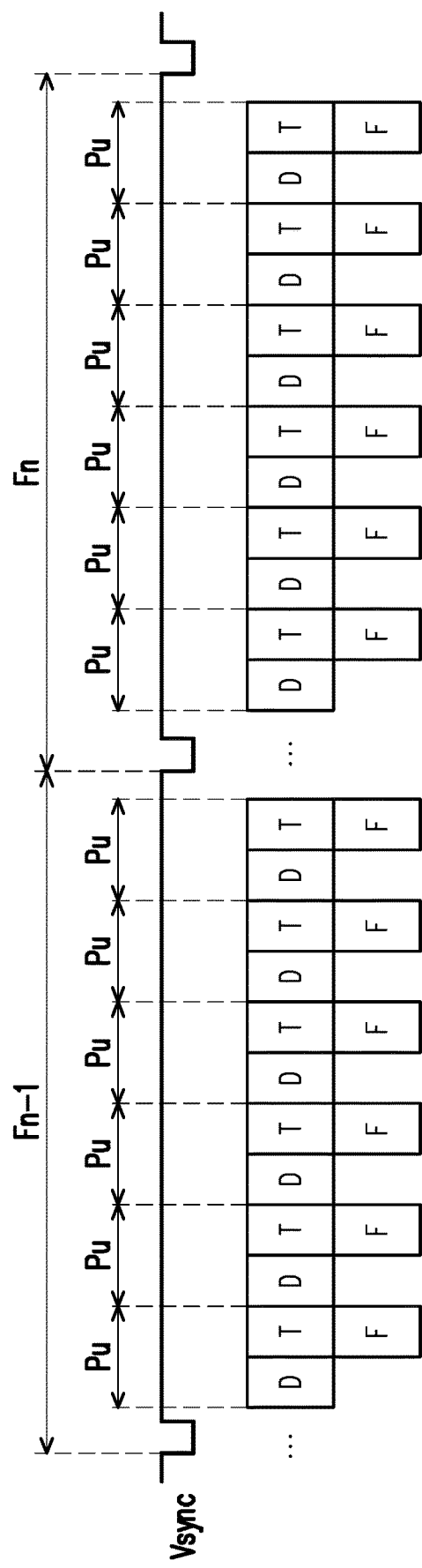
FIG. 12 is a schematic diagram illustrating a plurality of unit periods of a display frame period according to further another embodiment of the invention.

FIG. 12 is a schematic diagram illustrating a plurality of unit periods of a display frame period according to further another embodiment of the invention. In FIG. 12, the horizontal axis represents the time. A vertical synchronous signal Vsync, a current display frame period Fn and a previous display frame period Fn−1 illustrated in FIG. 12 may be inferred with reference to the descriptions related to the embodiments illustrated in FIG. 4 through FIG. 8, and unit periods PU, display driving periods D, touch sensing periods T and fingerprint sensing periods F illustrated in FIG. 12 may be inferred with reference to the descriptions related to the embodiments illustrated in FIG. 4 through FIG. 6, which will not be repeated. It should be noted that in the embodiment illustrated in FIG. 12, each of the unit periods PU includes a display driving period D, a touch sensing period T and a fingerprint sensing period F, wherein in each of the unit periods PU, the display driving period D and the touch sensing period T do not overlap with each other, and the fingerprint sensing period F overlaps with the touch sensing period T.

FIG. 13 is a schematic diagram illustrating a plurality of unit periods of a display frame period according to another embodiment of the invention. In FIG. 13, the horizontal axis represents the time. A vertical synchronous signal Vsync, a current display frame period Fn and a previous display frame period Fn−1 illustrated in FIG. 13 may be inferred with reference to the descriptions related to the embodiments illustrated in FIG. 4 through FIG. 8, and unit periods PU, display driving periods D, touch sensing periods T and fingerprint sensing periods F illustrated in FIG. 13 may be inferred with reference to the descriptions related to the embodiments illustrated in FIG. 4 through FIG. 6, which will not be repeated. It should be noted that in the embodiment illustrated in FIG. 13, each of the unit periods PU includes a display driving period D, a touch sensing period T and a fingerprint sensing period F, wherein in each of the unit periods PU, the display driving period D and the touch sensing period T do not overlap with each other, and the fingerprint sensing period F overlaps with the display driving period D and the touch sensing period T.

FIG. 14 is a schematic diagram illustrating a plurality of unit periods of a display frame period according to yet another embodiment of the invention. In FIG. 14, the horizontal axis represents the time. A vertical synchronous signal Vsync, unit periods PU, a current display frame period Fn and a previous display frame period Fn−1 illustrated in FIG. 14 may be inferred with reference to the descriptions related to the embodiments illustrated in FIG. 4 through FIG. 8 and thus, will not be repeated. In the embodiment illustrated in FIG. 14, each of the unit periods PU includes a display driving period D, a touch sensing period T, a first fingerprint sensing sub-period F1 and a second fingerprint sensing sub-period F2. The display driving periods D and the touch sensing periods T illustrated in FIG. 14 may be inferred with reference to the descriptions related to the display driving periods D and the touch sensing periods T illustrated in FIG. 4 through FIG. 6, and the first fingerprint sensing sub-periods F1 and the second fingerprint sensing sub-periods F2 illustrated in FIG. 14 may be inferred with reference to the description related to the fingerprint sensing periods F illustrated in FIG. 4 through FIG. 6, which will not be repeated. It should be noted that in each of the unit periods PU, the display driving period D and the touch sensing period T do not overlap with each other, the first fingerprint sensing sub-period F1 overlaps with the display driving period D, and the second fingerprint sensing sub-period F2 overlaps with the touch sensing period T.

Figure 15:
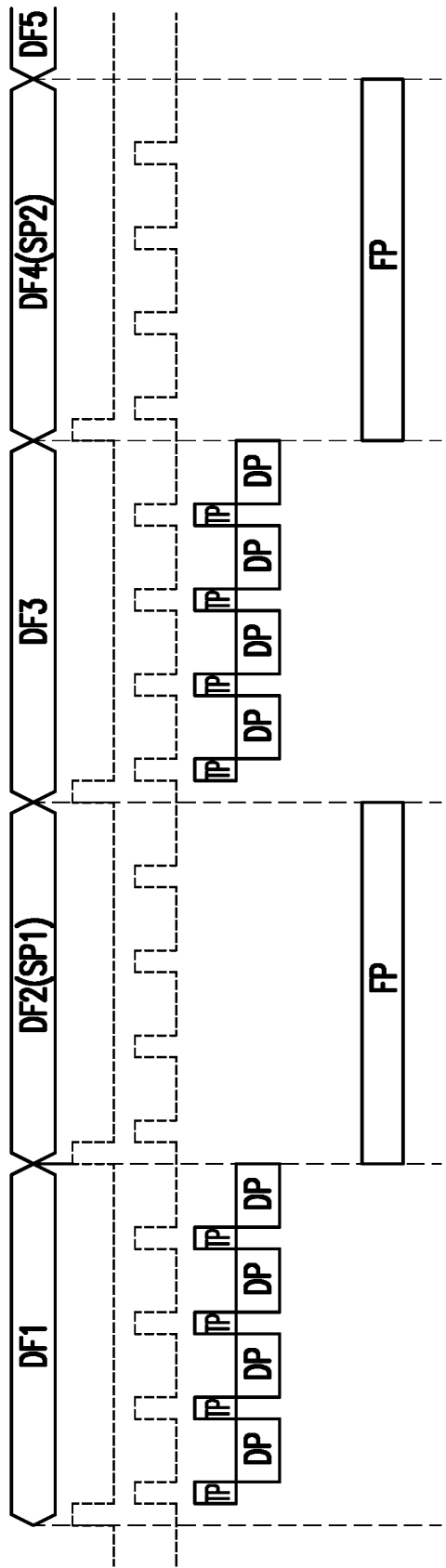
FIG. 15 is a schematic diagram illustrating two skip periods according to yet another embodiment of the invention.

FIG. 15 is a schematic diagram illustrating timing schemes according to yet another embodiment of the invention. The lateral axis illustrated in FIG. 15 represents the time. A plurality of frame periods illustrated in FIG. 15 includes frame periods DF1, DF2, DF3, DF4 and DF5. In the embodiment illustrated in FIG. 15, the frame periods DF1, DF3 and DF5 are configured as three display frame periods, the frame period DF2 is configured as the skip period SP1, and the frame period DF4 is configured as the skip period SP2.

Referring to FIG. 1 and FIG. 15, the driving circuit 110 performs one or both of a display driving operation and a touch sensing operation during a display frame period (e.g., the frame period DF1). In the embodiment illustrated in FIG. 15, the driving circuit 110 performs the display driving operation DP on the pixel circuit array of the display panel 120, and performs the touch sensing operation TP on the in-display touch sensor array of the display panel 120 during the frame period DF1 (display frame period). A time period in which the display driving operation DP is performed and a time in which the touch sensing operation TP is performed do not overlap with each other. The operation details of the display driving operation DP and the touch sensing operation TP may be inferred with reference to the description related to the operation of the display driving periods D and the operation of the touch sensing period T, which will not be repeated. During the frame period DF1, the driving circuit 110 skips (stops performing) the fingerprint sensing operation FP during the frame period DF1.

After the frame period DF1 (display frame period) ends, the driving apparatus 110 enters the frame period DF2 (i.e., the skip period SP1). In one embodiment, the driving apparatus 110 skips (stops performing) the display driving operation DP and the touch sensing operation TP during the skip period SP1. In another embodiment, the driving apparatus 110 performs the touch sensing operation TP and skips (stops performing) the display driving operation DP during the skip period SP1. The driving circuit 110 performs the fingerprint sensing operation FP on the display panel 120 during the skip period SP1. The operation details of the fingerprint sensing operation FP may be inferred with reference to the description related to the operation of the fingerprint sensing period F, which will not be repeated.

After the frame period DF2 (i.e., the skip period SP1) ends, the driving apparatus 110 enters the frame period DF3 (display frame period). After the frame period DF3 (display frame period) ends, the driving apparatus 110 enters the frame period DF4 (i.e., the skip period SP2). The operation details of the frame period DF3 may be inferred with reference to the description related to the frame period DF1, and the operation details of the frame period DF4 (i.e., the skip period SP2) may be inferred with reference to the descriptions related to the frame period DF2 (i.e., the skip period SP1), which will not be repeated.

According to different design requirements, the block of the driving circuit 110 may be implemented in a form of software, firmware or hardware or a combination of many of the aforementioned three forms. In terms of the form of hardware, the block of the driving circuit 110 may be implemented as a logic circuit on an integrated circuit. Related functions of the driving circuit 110 may be implemented as hardware elements by using hardware description languages (e.g., Verilog HDL or VHDL) or other suitable programming languages. For example, the related functions of the driving circuit 110 may be implemented as various logical blocks, modules and circuits in one or more controllers, microcontrollers, microprocessors, application-specific integrated circuits (ASICs), digital signal processors (DSPs), field programmable gate arrays (FPGAs) and/or other processing units.

In terms of the form of software and or firmware, the related functions of the driving circuit 110 may be implemented as programming codes. For example, the driving circuit 110 may be implemented by employing general programming languages (e.g., C, C++ or Assembly) or other suitable programming languages. The programming codes may be recorded/stored in recording media, which include, for example, a read only memory (ROM), a storage device and/or a random access memory (RAM). The programming codes may be read from the recording media by a computer, a central processing unit (CPU), a controller, a microcontroller or a microprocessor and executed, so as to perform the related functions. As the recording media, "non-transitory computer readable media", such as a tape, a disk, a card, a semiconductor, a programmable logic circuit, etc., may be used. In addition, the program codes may also be provided to the computer (or the CPU) through any transmission medium (e.g., a communication network or a broadcast wave). The communication network includes, for example, Internet, wired communication, wireless communication or other communication media.

In light of the foregoing, the display apparatus and the fingerprint sensing method provided by the embodiments of the invention can drive the display panel having the pixel circuit array, the in-display touch sensor array and the in-display fingerprint sensor array. A display frame period corresponding to the pixel circuit array can be divided into a plurality of unit periods. During the current display frame period, each of the unit periods includes the display driving period (and/or the touch sensing period) and the at least one fingerprint sensing period. In this way, the display apparatus and the fingerprint sensing method thereof provided by the embodiments of the invention can arrange the timing relationship between the display driving periods (and/or the touch sensing periods) and the fingerprint sensing periods.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A display apparatus, comprising:
    a display panel, having a pixel circuit array, an in-display touch sensor array and an optical in-display fingerprint sensor array; and
    a driving circuit, coupled to the display panel, and configured to drive the optical in-display fingerprint sensor array to obtain information for generating a fingerprint image, wherein the driving circuit performs one or both of a display driving operation and a touch sensing operation during a display frame period which has a length of one frame period determined according to a vertical synchronous signal,
    the display frame period is one of a plurality of frame periods,
    the driving circuit performs a fingerprint sensing operation during a skip period comprising at least two consecutive frame periods among the plurality of frame periods, and the optical in-display fingerprint sensor array is embedded in the display panel.

2. The display apparatus according to claim 1, wherein the display driving operation and the touch sensing operation are skipped during the skip period.

3. The display apparatus according to claim 1, wherein the display driving operation is skipped during the skip period.

* * * * *